(12) United States Patent
Hamprecht

(10) Patent No.: US 6,627,742 B1
(45) Date of Patent: Sep. 30, 2003

(54) HYDROXYPYRIDONEMETHIDE AZO DYES

(75) Inventor: Rainer Hamprecht, Odenthal (DE)

(73) Assignee: DyStar Textilfarben GmbH & Co. Deutschland KG (DE)

( * ) Notice: Subject to any disclaimer, the term of this patent is extended or adjusted under 35 U.S.C. 154(b) by 0 days.

(21) Appl. No.: 10/297,303

(22) PCT Filed: Jun. 6, 2001

(86) PCT No.: PCT/EP01/06408

§ 371 (c)(1), (2), (4) Date: Dec. 4, 2002

(87) PCT Pub. No.: WO01/94314

PCT Pub. Date: Dec. 13, 2001

(30) Foreign Application Priority Data

Jun. 9, 2000 (DE) .......................... 100 28 686

(51) Int. Cl.$^7$ .......................... C09B 29/10; C09B 67/22
(52) U.S. Cl. .................. 534/771; 8/639; 8/662
(58) Field of Search .............. 534/771; 8/639, 8/662

(56) References Cited

U.S. PATENT DOCUMENTS

| | | | |
|---|---|---|---|
| 5,066,791 A | 11/1991 | Hansen et al. | 534/772 |
| 5,389,110 A | 2/1995 | Dix et al. | 8/670 |
| 5,808,015 A | 9/1998 | Hamprecht | 534/771 |
| 5,955,615 A | 9/1999 | Hamprecht | 546/286 |

FOREIGN PATENT DOCUMENTS

| | | |
|---|---|---|
| DE | 3 508 904 | 9/1986 |
| EP | 0 268 897 | 6/1988 |
| EP | 0 302 401 | 2/1989 |
| EP | 0 314 002 | 9/1991 |
| EP | 0 399 473 | 9/1993 |
| EP | 0 585 654 | 3/1994 |
| EP | 0 474 600 | 12/1994 |
| EP | 0 767 220 | 4/1999 |
| EP | 0 827 988 | 12/2001 |
| GB | 2 036 775 | 7/1980 |
| JP | 58 157863 | 9/1983 |

*Primary Examiner*—Fiona T. Powers
(74) *Attorney, Agent, or Firm*—Connolly Bove Lodge & Hutz LLP

(57) ABSTRACT

Hydroxypyridonemethide azo dyes conforming to the formula (I) or its tautomeric forms

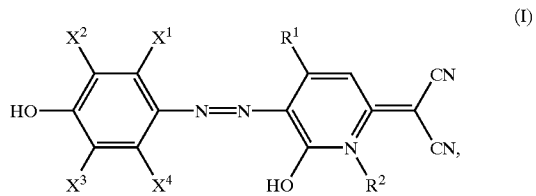

where $X^1$ to $X^4$, $R^1$ and $R^2$ are each as defined in the description part,
are very useful for dyeing and printing hydrophobic synthetic fiber materials and their blends with natural fiber materials.

19 Claims, No Drawings

HYDROXYPYRIDONEMETHIDE AZO DYES

The invention relates to novel hydroxypyridonemethide azo dyes, processes for their preparation and their use and also dye mixtures containing hydroxypyridonemethide azo dyes. EP-A 767 220 already discloses similar azo dyes. These dyes, however, are still in need of improvement with regard to their application properties, especially their thermomigration fastness.

Novel hydroxypyridonemethide azo dyes have been found that, surprisingly, are notable for excellent thermomigration fastness and sublimation fastness coupled with good general fastnesses.

The present invention provides novel hydroxypyridonemethide azo dyes conforming to the formula (I) or its tautomeric forms

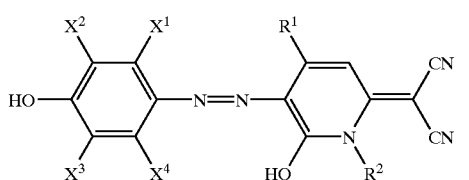

(I)

where
$X^1$ is H, Cl, Br, —CN, —CH=O, —CO—T, —CO$_2$—R$^2$, —SO$_2$—T, or —NO$_2$,
$X^2$, $X^3$ and $X^4$ are independently H, Cl or Br,
$R^1$ is H, T, or —CF$_3$, and
$R^2$ is straight-chain or branched $C_1$–$C_4$-alkyl,
where
T is straight-chain or branched $C_1$–$C_{10}$-alkyl which may be interrupted by 1 or 2 oxygen atoms in ether function and/or substituted by one or more, preferably one, phenyl or hydroxyl radicals, or is phenyl which may be substituted by 1 to 2 identical or different radicals selected from the group consisting of Cl, Br and $C_1$–C2-alkyl.

The dyes of the formula (I) can also exist in tautomeric forms, of which the most important is the formula (Ia)

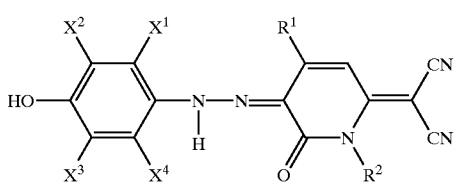

(Ia)

For the purposes of the present invention, the formula (I) in its general and preferred meanings includes all possible tautomeric forms, especially that of the formula (Ia).

Preference is given to hydroxypyridonemethide azo dyes of the formula (I) or (Ia) where
$X^2$, $X^3$ and $X^4$ are each H.

Particular preference is given to dyes of the formulae (I) and (Ia), where
$X^2$, $X^3$ and $X^4$ are each H,
$R^1$ is H, —CH$_3$, —C$_2$H$_5$, —CH(CH$_3$)$_2$, unsubstituted phenyl or CF$_3$, and
$R^2$ is CH$_3$ or C$_2$H$_5$.

Very particular preference is given to dyes of the formula (I) where
$x^1$ is H, Cl, Br, or —NO$_2$,
$X^2$, $X^3$ and $X^4$ are each H,
$R^1$ is H, —CH$_3$, —C$_2$H$_5$, or —CH(CH$_3$)$_2$, and
$R^2$ is CH$_3$ or —C$_2$H$_5$.

Preference is given in particular to dyes of the formula (I) where
$X^1$ is nitro,
$X^2$, $X^3$ and $X^4$ are each H,
$R^1$ is H or CH$_3$, and
$R^2$ is CH$_3$ or C$_2$H$_5$.

The dyes of the invention may be prepared, for example, by diazotizing an amine of the formula (II)

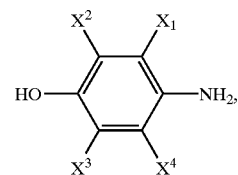

(II)

where
$X^1$, $X^2$, $X^3$ and $X^4$ are each as defined above,
and coupling it onto a coupling component of the formula (III)

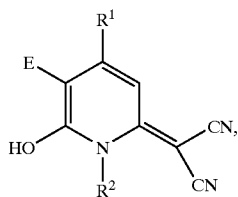

(III)

where
$R^1$ and $R^2$ are each as defined above and
E is a substituent that is displaceable by electrophilic substitution, preferably by H, —CO$_2$H, —CH$_2$OH, —SO$_3$H, —CH=O, —COT, —CONH$_2$, —CONHT,
and where T is as defined above.

Such a coupling process by displacement of a substituent is described for example in GB-A 2036 775 and JP-A 58 157 863.

The coupling reaction may be carried out in aqueous and nonaqueous solvents. Nonaqueous solvents are alcohols such as methanol, ethanol, propanol, butanol, pentanol, etc., dipolar aprotic solvents such as DMF, DMSO, NMP and water-immiscible solvents such as toluene or chlorobenzene.

The coupling is preferably carried out in a stoichiometric ratio of coupling component and diazo component, although it may be advantageous and sensible, partly for economic reasons, to use the cheaper component in an excess of up to 30%.

The coupling is generally effected at temperatures between –30 to 100° C., preference being given to temperatures of –10 to 30° C., and particular preference to temperatures of –5 to 10C.

The coupling may be carried out in an acidic as well as an alkaline medium. Preference is given to pH <10, particular preference to pH <7.0, very particular preference to pH <5.0.

The diazo components of the formula (II) are literature known and partly also, like the particularly preferred 3-nitro-4-aminophenol, commercially available.

The coupling components of the formula (III) are likewise known and their preparation is described for example in EP-A 767 220.

The dyes of the formula (I) according to the invention are useful as such, mixed with each other or else mixed with other disperse dyes for dyeing and printing, including by the inkjet process, hydrophobic synthetic fiber materials and their blends with natural fiber materials.

Useful hydrophobic synthetic materials include for example secondary cellulose acetate, cellulose triacetate, polyamides and particularly polyesters, for example polyethylene glycol terephthalate. Examples of useful natural fiber materials are cotton, regenerated cellulose fibers and wool.

The dyes of the invention or mixtures thereof are also useful for coloring and printing waxes, oils and plastics such as polymethacrylate, PVC, polystyrene or ABS.

They are also useful for textile and nontextile thermal transfer printing, for example by means of a thermal head.

The coloring, dyeing and printing conditions, which include dyeing in supercritical carbon dioxide, are known per se, cf. for example EP-A 827 988, DE-A 3508 904 and EP-A 474 600.

The dyes of the invention or mixtures thereof can also be used for dyeing keratinic fibers, for example in hair dyeing or in the dyeing of furs.

The novel dyes of formula (I) or their mixtures are further very useful for producing color filters as described for example in EP-A-399 473.

Finally they are also useful as colorants for preparing toners for electrophotography.

The dyes of the invention or the mixtures thereof dye polyester in orange to violet shades having excellent thermomigration fastness and sublimation fastness, high color strength and a bright hue.

Particularly good affinity and build-up is provided by mixtures of the dyes of formula (I) which contain two or more, preferably two to 4, different dyes of the formula (I). Preference is given to mixtures which differ in the $R^1$ and/or $R^2$ substituents.

The present invention further provides dye mixtures containing at least one dye of the formula (I) and also at least one further disperse dye. Useful disperse dyes are the disperse dyes listed in the Color Index, especially benzodifuranone dyes, and also the disperse dyes known from EP-A 767 220.

Benzodifuranone dyes which are preferentially suitable as mixture dyes are derived from the formula (IV)

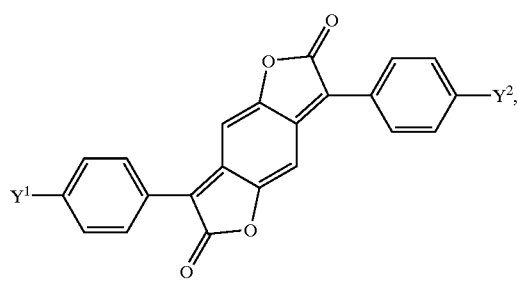

(IV)

where
$Y^1$ and $Y^2$ are independently H, $C_1$–$C_6$-alkoxy, with or without $C_1$–$C_4$-alkoxycarbonyl, $C_1$–$C_4$-alkoxy-$C_2$–$C_4$-alkoxycarbonyl or furfuryl substitution, —$OC_2H_4$—O—$C_1$–$C_4$-alkyl or —$OC_2H_4$—O—$(C_2H_4O)_{1-6}$—$C_1$–$C_4$-alkyl.

Of these, the following may be mentioned in particular:
(IVa) $Y^1$=OCH$_2$CH$_2$CH$_3$, $Y^2$=H

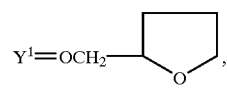

(IVb)

$Y^2$=H
(IVc) $Y^1$=OCH$_2$CH$_2$CH$_3$, $Y^2$=OCH$_2$CO$_2$C$_2$H$_4$OC$_2$H$_5$
(IVd) $Y^1$=H, $Y^2$=OCH$_2$CO$_2$C$_2$H$_4$OC$_2$H$_5$

Preference is given to dye mixtures containing at least one dye of the formula (I) and at least one dye of the formula (IV).

Preference is further given to dye mixtures containing at least one dye of the formula (I) and at least one disperse dye of the formula (V)

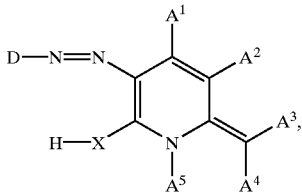

(V)

where
D is the radical of a carbo- or heterocyclic diazo component,
$A^1$ and $A^2$ are independently H or a typical pyridone substituent,
$A^5$ is H, a radical of the formula T, —OT$^1$, —NH$_2$, —NHT, —NT$_2$, —NHCOH, —NHCOT, —N=CH—T,—N=CT$_2$ or —NHSO$_2$T,
or
$A^1$ and $A^2$ and/or
$A^2$ and $A^3$ and/or
$A^4$ and $A^5$ combine with the atoms in between in each case to form an unsaturated, substituted or unsubstituted 5- or 6-membered carbo- or heterocycle, with the proviso that in the event of ring formation by participation of one of $A^3$ and $A^4$ the nonparticipant radical is an electron-attracting radical,
X is O, NH, NT, NCOT, NCO$_2$T or NSO$_2$T,
$A^3$ and $A^4$ are independently —CN, —CO$_2$T, —CONH$_2$, —CONHT, —CONT$_2$, CF$_3$, —CHO, —COT, —SO$_2$T, —SO3T$^4$, —SO$_3$T$^5$, SO$_2$NH$_2$, SO$_2$NHT, SO$_2$NT$_2$, —SOT, —CH=NH, —CH=NT, —CT=NH, —CT=NT,

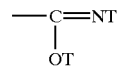

—CO—CO$_2$T, —NO$_2$, —NO, or T$^4$ T$^5$
but $A^3$ and $A^4$ are preferably not both T$^4$ and/or T$^5$
or
$A^3$ and $A^4$ combine with the carbon atom to which they are attached to form a cyclic active-methylene compound of the formula (VIa) to (VIv), these radicals being specified in the form of

-continued
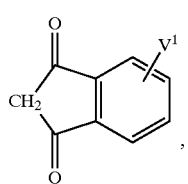 (VIa)
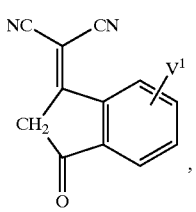 (VIb)
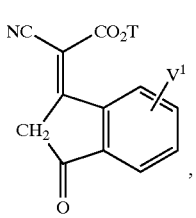 (VIc)
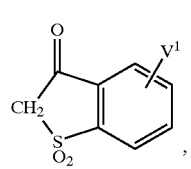 (VId)
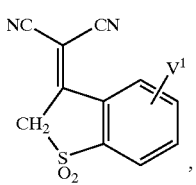 (VIe)
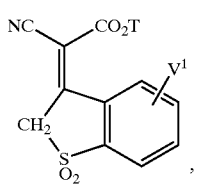 (VIf)
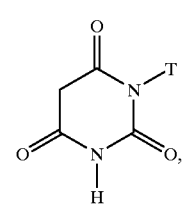 (VIg)
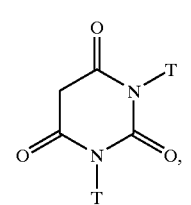 (VIh)
-continued
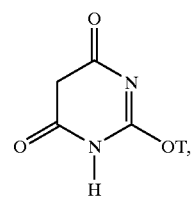 (VIi)
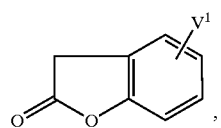 (VIj)
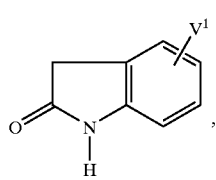 (VIk)
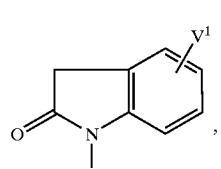 (VIl)
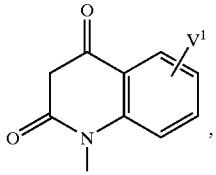 (VIm)
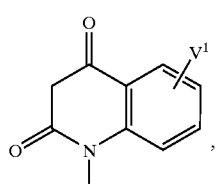 (VIn)
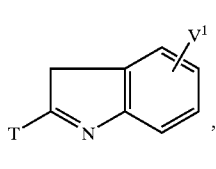 (VIo)
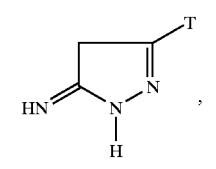 (VIp)
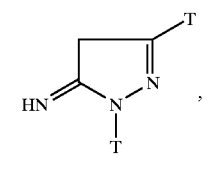 (VIq)

-continued (VIr)
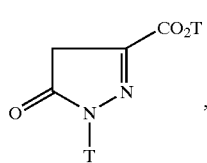

(VIs)
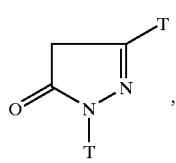

(VIt)
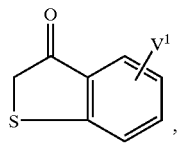

(VIu)
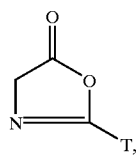

(VIv)
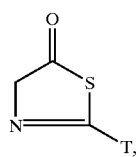

where
$V^1$ is H or a substituent, especially Cl, Br, $CH_3$, $-CO_2T^1$, $-CN$, $-NO_2$, $-CF_3$ or $-SO_2T^1$, and
where
T is $T^1$ to $T^5$, where
$T^1$ is alkyl, cycloalkyl or aralkyl,
$T^2$ is alkenyl,
$T^3$ is alkynyl,
$T^4$ is aryl and
$T^5$ is hetaryl.

In particularly preferred disperse dyes of the formula (V)
$A^1$ is H, $T^1$, $T^4$ or $-CF_3$,
$A^2$ is H, $-CN$, $-CO_2T^1$, $-CONHT^1$ or $-CF_3$,
$A^3$ and $A^4$ are independently $-CN$, $-CO_2T^1$, $-CONHT^1$, $-CF_3$, $-CHO$, $-COT$, $-SO_2T$, $-NO^2$, $-T^4$ or $-T^5$,
subject to the proviso that
$A^3$ and $A^4$ are not both $T^4$ or $T^5$,
$A^5$ is H, $T^1$, $T^2$, $T^4$,
D is a radical of the formula

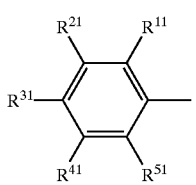

where
$R^{11}$ and $R^{51}$ are independently H, $CF_3$, Cl, Br, $-CN$, $-NO_2$, $-CO_2T^1$, $T^1$, $T^5$, $-SO_2T^1$, $-SO_2T^4$, $-OT^1$, $-OT^2$, $-OT^4$, $-OCOT^4$, $-OCOT^4$, $-OSO_2T^1$ or $-OSO_2T^4$, $R^{21}$ and $R^{41}$ are independently H, Cl, Br, $-NO_2$, $-CF_3$, $T^1$, $-OT^1$, $-OT^2$, $-OT^4$, $-OCOT^1$, $-OCOT^4$, $-OSO_2T^1$ or $-OSO_2T^4$,
$R^{31}$ is H, Cl, Br, $-CN$, $-NO_2$, $-CF_3$, $-CO_2T^1$, $T^1$, $T^5$, $-OT^1$, $-OT^2$, $-OT^4$, $-OCOT^1$, $-OCOT^4$, $-SO_3T^1$ or $-SO_2T^4$,
$T^1$ is $C_1$–$C_8$-alkyl which may be substituted by $C_1$–$C_8$-alkoxy, $-C_1$–$C_8$-alkoxy-$C_2$–$C_5$-alkoxy, $-OCOT^1$, $-CO_2T^1$, Cl, Br, $-CN$ or $T^4$,
$T^2$ is $C_2$–$C_8$-alkenyl which may be substituted by $-C_1$–$C_8$-alkoxy, $-C_1$–$C_8$-alkoxy-$C_2$–$C_5$-alkoxy, $-CN$, $-CO_2T^1$, Cl or Br,
$T^4$ is phenyl which may be substituted by Cl, Br, $T^1$, $OT^1$, $-CF_3$, $-NO_2$, $-CN$ or $-CO_2T^1$,
$T^5$ is oxazole, phenyloxazole, benzoxazole, thiazole, benzothiazole, thiadiazole or thiophene, which may be substituted by Cl, Br, $T^1$, $-NO_2$ and/or $-CO_2T^1$, and
X is O.

In very particularly preferred disperse dyes of the formula (V)
$A^1$ is H or $T^1$,
$A^2$ is H, $-CN$ or $-CO_2T^1$,
$A^3$ is $-CN$ or $-CO_2T^1$,
$A^4$ is $A^3$,
$A^5$ is H or $T^1$,
D is a radical of the formula

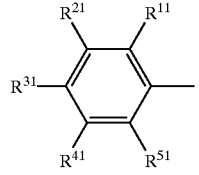

where
$R^{11}$ and $R^{51}$ are independently H, Cl, Br, $-CN$, $-NO_2$, $-CO_2T^1$, $T^1$, $-OT^1$ or $-OT^4$,
$R^{21}$ and $R^{41}$ are independently H, Cl, Br, $-NO_2$, $T^1$ or $-OT^1$,
$R^{31}$ is H, Cl, Br, $-CN$, $-NO_2$, $T^1$, $-CO_2T^1$ or $-OT^1$,
$T^1$ is $C_1$–$C_6$-alkyl,
$T^4$ is phenyl which may be substituted by Cl, Br, $-NO_2$ and/or $-CO_2T^1$ and
X is O.

Preference is likewise given to dye mixtures containing at least one dye of the formula (I), at least one dye of the formula (IV) and at least one dye of the formula (V).

The dyes and dye mixtures of the invention may be converted into solid or liquid preparations by grinding, for example in a bead mill, in the presence of assistants such as for example dispersants, wetting agents and dustproofers.

EXAMPLE 1

A mixture of 7.3 ml of 50% of sulfuric acid and 9.0 ml of 96% of sulfuric acid was gradually admixed with 9.1 g of 4-amino-3-nitrophenol at 0° C. 11 ml of 40% of nitrosyl-sulfuric acid were added dropwise at 0° C. After 4 hours of reaction at 0° C., the diazotization solution was added dropwise to an alkaline solution of 10.0 g of 6-hydroxy-1-methyl-2-(1H)-pyridinylidenepropanedinitrile and 2 g of urea in 300 ml of water. A little ice was added to maintain the temperature at 0–5° C. Sodium acetate was used to adjust the batch to pH 2. The batch was stirred overnight and filtered with suction, the filter residue was washed with water, and drying of the press cake afforded 10 g of the dye of the formula

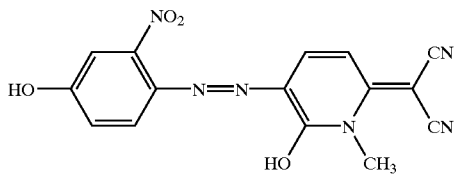

which may be further purified by recrystallization from DMF.

$\lambda_{max}$=517 nm (CH$_2$Cl$_2$)

The dye dyes polyester in a bright red having excellent fastnesses especially wetfastnesses and sublimation fastness.

Analogous or similar methods may be used to obtain the following dyes which likewise dye polyester with good fastnesses:

| Ex. No. | $X^1$ | $X^2$ | $X^3$ | $X^4$ | $R^1$ | $R^2$ | $\lambda_{max.}$ (nm) | Hue on polyester |
|---|---|---|---|---|---|---|---|---|
| 2 | —NO$_2$ | H | H | H | H | C$_2$H$_5$ | 517(CH$_2$Cl$_2$) | red |
| 3 | —NO$_2$ | H | H | H | CH$_3$ | CH$_3$ | 517(DMF) | red |
| 4 | —NO$_2$ | H | H | H | CH$_3$ | C$_2$H$_5$ | 517(DMF) | red |
| 5 | —CO$_2$CH$_3$ | H | H | H | H | CH$_3$ | 504(CH$_2$Cl$_2$) | red |
| 6 | H | Cl | Cl | H | H | CH$_3$ | 496(CH$_2$Cl$_2$) | scarlet |
| 7 | H | H | H | H | H | CH$_3$ | 508(CH$_2$Cl$_2$) | red |
| 8 | Br | H | H | H | H | CH$_3$ | 505(CH$_2$Cl$_2$) | red |

EXAMPLE 9

Bead milling and subsequent spray drying is used to prepare a dyeing product from 10 parts of the dye of Example 1, 10 parts of the dye of Example 2, 10 parts of the dye of the formula

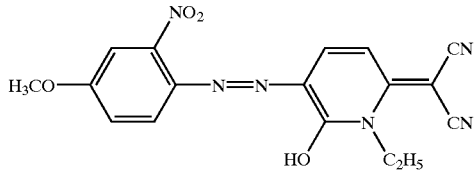

63 pars of standardizer based on a dispersant (commercially available ligninsulfonate: condensation products of formaldehyde, naphthalene and sulfuric acid), commercially available wetting agents (alkoxylated alkylphenols), commerically available dustproofers (mineral oil with emulsifiers) and 7 parts of residual moisture.

In a dye bath set to a pH of 4.5 with sodium phosphate and acetic acid, 100 parts of a polyester fabric (polyethylene terephthalate) are dyed with 0.9 g of the above-described dyeing product at a liquor ratio of 10:1 to 40:1 at 125 to 135° C. for 30 to 45 minutes.

This provides bright red dyeings having good fastnesses, especially good affinity and excellent thermomigration fastness.

EXAMPLE 10

Bead milling and subsequent spray drying is used to prepare a dyeing product from 18.8 parts of the dye of Example 4,
12.5 parts of the dye of Example 3,
62.6 parts of standardizer based on commercially available ligninsulfonates, commercially available dispersants (condensation products of formaldehyde, naphthalene and sulfuric acid), commercially available wetting agents (alkoxylated alkylphenols), commercially available dustproofers (mineral oil with emulsifiers) and
6.1 parts of residual moisture.

In a dye bath set to a pH of 4.5 with sodium phosphate and acetic acid, 100 parts of a polyester fabric (polyethylene terephthalate) are dyed with 0.75 g of the above-described dyeing product at a liquor ratio of 10:1 to 40:1 at 125 to 135° C. for 30 to 45 minutes.

This provides bright red dyeings having good fastnesses, especially good, affinity and excellent thermomigration fastness.

What is claimed is:

1. A hydroxypyridonemethide azo dye conforming to the formula (I) and its tautomeric forms

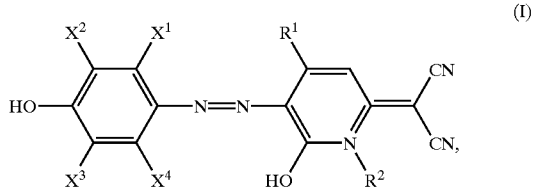

(I)

where $X^1$ is H, Cl, Br, —CN, —CH=O, —CO—T, —CO$_2$—R$^2$, —SO$_2$—T, or —NO$_2$, $X^2$, $X^3$ and $X^4$ are independently H, Cl or Br, $R^1$ is H, T, or —CF$_3$, and $R^2$ is straight-chain or branched C$_1$–C$_4$-alkyl, where T is straight-chain or branched C$_1$–C$_{10}$-alkyl which may be interrupted by 1 or 2 oxygen atoms in ether function and/or substituted by one or more phenyl or hydroxyl radicals, or is phenyl which may be substituted by 1 to 2 radicals selected from the group consisting of Cl, Br and C$_1$–C$_2$-alkyl.

2. A dye as claimed in claim 1, wherein $X^2$, $X^3$ and $X^4$ are each H.

3. The dye as claimed in claim 1, wherein $X^2$, $X^3$ and $X^4$ are each H, $R^1$ is H, —CH$_3$, —C$_2$H$_5$, —CH(CH$_3$)$_2$, unsubstituted phenyl or CF$_3$, and $R^2$ is CH$_3$ or C$_2$H$_5$.

4. The dye as claimed in claim 2, wherein $X^2$, $X^3$ and $X^4$ are each H, $R^1$ is H, —CH$_3$, —C$_2$H$_5$, —CH(CH$_3$)$_2$, unsubstituted phenyl or CF$_3$, and $R^2$ is CH$_3$ or C$_2$H$_5$.

5. The dye as claimed in claim 1, wherein $X^1$ is H, Cl, Br, or —NO$_2$, $X^2$, $X^3$ and $X^4$ are each H, $R^1$ is H, —CH$_3$, —C$_2$H$_5$, or —CH(CH$_3$)$_2$, and $R^2$ is CH$_3$ or —C$_2$H$_5$.

6. The dye as claimed in claim 4, wherein $X^1$ is H, Cl, Br, or —$NO_2$, $R^1$ is H, —$CH_3$, —$C_2H_5$, or —$CH(CH_3)_2$.

7. A dye as claimed in claim 1, wherein $X^1$ is nitro, $X^2$, $X^3$ and $X^4$ are each H, $R^1$ is H or $CH_3$, and $R^2$ is $CH_3$ or —$C_2H_5$.

8. A dye as claimed in claim 6, wherein $X^1$ is nitro, $R^1$ is H or $CH_3$.

9. A process for preparing the aye of claim 1, which comprises diazotizing an amine of the formula (II)

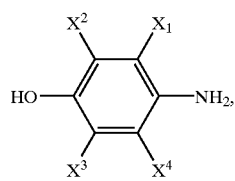
(II)

where $X^1$, $X^2$, $X^3$ and $X^4$ are each as defined in claim 1, and coupling it onto a coupling component of the formula (III)

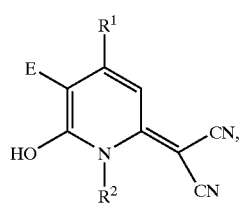
(III)

where $R^1$ and $R^2$ are each as defined in claim 1 and

E is a substituent that is displaceable by electrophilic substitution.

10. A dye mixture containing at least two different dyes of the formula (I) as claimed in claim 1.

11. A dye mixture as claimed in claim 10, wherein the dyes of the formula (I) differ with regard to $R^1$ and/or $R^2$, $R^1$ being H or $CH_3$ and $R^2$ being $CH_3$ or $C_2H_5$.

12. A dye mixture containing at least one dye of the formula (I) as claimed in claim 1 and at least one disperse dye that differs from the formula (I).

13. A dye mixture comprising at least one dye of the formula (I) as claimed in claim 1, at least one dye of the formula (IV) or formula (V) or mixture of formulas (IV) and (V)

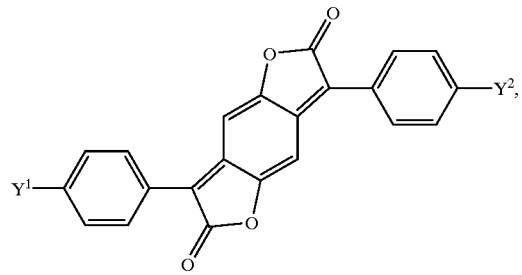
(IV)

wherein $Y^1$ and $Y^2$ are independently H, $C_1$-$C_6$-alkoxy, with or without $C_1$-$C_4$-alkoxy-carbonyl, $C_1$-$C_4$-alkoxy-$C_2$-$C_4$-alkoxycarbonyl or furfuryl substitution, —$OC_2H_4$—O—$C_1$-$C_4$-alkyl, or —$OC_2H_4$—O—$(C_2H_{4O})_{1-6}$—$C_1H_4$-alkyl,

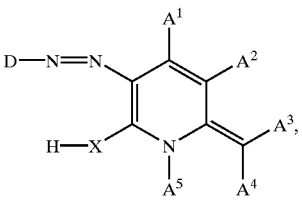
(V)

wherein

D is the radical of a carbo- or heterocyclic diazo component, $A^1$ and $A^2$ are independently H or a pyridine substituent, $A^5$ is H, a radical of the formula T, —$OT^1$, —$NH_2$, —NHT, —$NT_2$, —NHCOH, —NHCOT, —N=CH—T, N=$CT_2$ or $NHSO_2T$, or $A^1$ and $A^2$ and/or $A^2$ and $A^3$ and/or $A^4$ and $A^5$ combine with the atoms in between in each case to form an unsaturated, substituted or unsubstituted 5- or 6-membered carbo- or heterocycle, with the proviso that in the event of ring formation by participation of one of $A^3$ and $A^4$ the nonparticipant radical is an electron-attracting radical, X is O, NH, NT, NCOT, $NCO_2T$ or $NSO_2T$, $A^3$ and $A^4$ are independently —CN, —$CO_2T$, —$CONH_2$, —CONHT, —$CONT_2$, $CF_3$, —CHO, —COT, —$SO_2T$, —$SO_3T^4$, —$SO_3T^5$, $SO_2NH_2$, $SO_2NHT$, $SO_2NT_2$,—SOT, —CH=NH, —CH=NT, —CT=NH, —CT=NT,

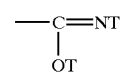

—CO—$CO_2T$, —$NO_2$, —NO, or $T^4$ $T^5$ but $A^3$ and $A^4$ are not both $T^4$ and/or $T^5$ or $A^3$ and $A^4$ combine with the carbon atom to which they are attached to form a cyclic active-methylene compound of the formula (VIa) to (VIv), these radicals being specified in the form of
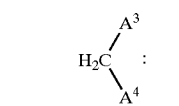
(VIa)
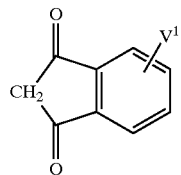
(VIb)
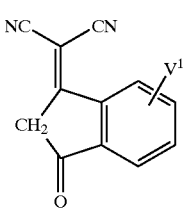
(VIc)
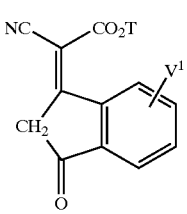
(VId)
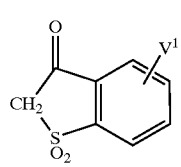
(VIe)
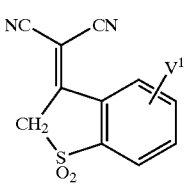
(VIf)
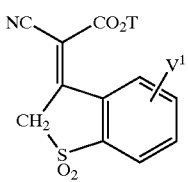
(VIg)
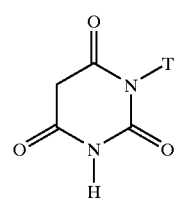
-continued
(VIh)
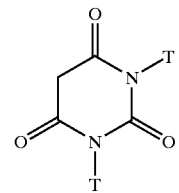
(VIi)
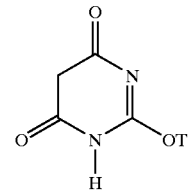
(VIj)
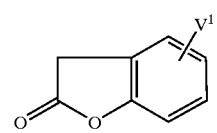
(VIk)
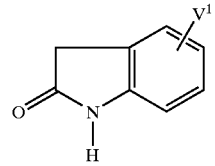
(VIl)
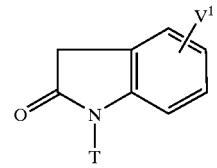
(VIm)
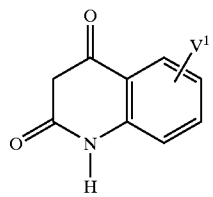
(VIm)
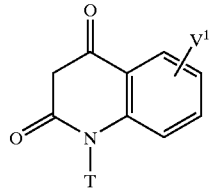
(VIo)
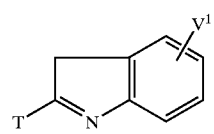

(VIp) 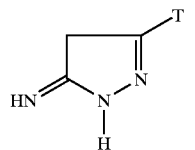

(VIq) 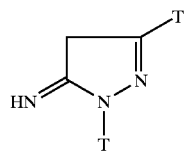

(VIr) 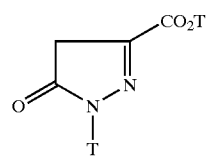

(VIs) 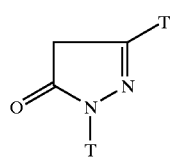

(VIt) 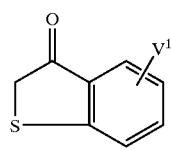

(VIu) 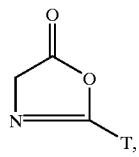

(VIv) 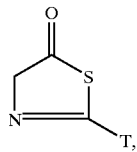

wherein $V^1$ is H or a substituent, wherein said substituent is Cl, Br, $CH_3$, $—CO_2T^1$, —CN, $—NO_2$, $—CF_3$ or $SO_2T$; and herein T is $T^1$ to $T^5$, where
  $T^1$ is alkyl, cycloalkyl or aralkyl,
  $T^2$ is alkenyl,
  $T^3$ is alkynyl,
  $T^4$ is aryl and
  $T^5$ is hetaryl.

14. A process for dying a hydrophobic synthetic fiber material or blends of hydrophobic synthetic fiber materials with a natural fiber material which comprises contacting the synthetic material with the dye as claimed in claim 1.

15. A process for dying a hydrophobic synthetic fiber material or blends of hydrophobic synthetic fiber materials with a natural fiber material which comprises contacting the synthetic material with the dye mixture as claimed in claim 10.

16. The process as claimed in claim 14, wherein the hydrophobic synthetic fiber materials are secondary cellulose acetate, cellulose triacetate, polyamides or polyesters and the natural fiber materials are cotton, regenerated cellulose fibers or wool.

17. The process as claimed in claim 15, wherein the hydrophobic synthetic fiber materials are secondary cellulose acetate, cellulose triacetate, polyamides or polyesters and the natural fiber materials are cotton, regenerated cellulose fibers or wool.

18. A dyed hydrophobic synthetic material dyed with the dye as claimed in claim 1.

19. A dyed hydrophobic synthetic material dyed with the dye mixture as claimed in claim 10.

* * * * *

UNITED STATES PATENT AND TRADEMARK OFFICE
CERTIFICATE OF CORRECTION

PATENT NO. : 6,627,742 B1
DATED : September 30, 2003
INVENTOR(S) : Rainer Hamprecht It is certified that error appears in the above-identified patent and that said Letters Patent is hereby corrected as shown below:

Column 11,
Line 15, "aye" should read -- dye --.

Column 16,
Line 13, "herein" should read -- wherein --.

Signed and Sealed this

Twenty-seventh Day of July, 2004

JON W. DUDAS
*Acting Director of the United States Patent and Trademark Office*